United States Patent [19]
Deane

[11] 4,327,295
[45] Apr. 27, 1982

[54] ENERGY CONSERVING DRIVE SYSTEM

[75] Inventor: Clifford T. Deane, Englewood, Fla.

[73] Assignee: Electro-Kinetics, Inc., Cream Ridge, N.J.

[21] Appl. No.: 186,596

[22] Filed: Sep. 12, 1980

[51] Int. Cl.³ .............................................. H02J 3/30;
[52] U.S. Cl. ................................ 290/40 C; 180/65 E;
   307/46; 307/48; 318/139
[58] Field of Search ............ H02J 3/32 318/72, 127,
   318/147, 151, 139; 307/46, 48, 66, 67; 320/21,
   42; 290/40 B, 40 C; 180/65 R, 65 E

[56] References Cited
U.S. PATENT DOCUMENTS

| | | | |
|---|---|---|---|
| 674,825 | 5/1901 | De Castro | 318/4 |
| 2,125,806 | 8/1938 | Pestarini | 318/147 |
| 4,153,128 | 5/1979 | Heitmeyer et al. | 180/65 E |
| 4,187,436 | 2/1980 | Etienne | 180/65 R |

Primary Examiner—J. V. Truhe
Assistant Examiner—Shelley Wade
Attorney, Agent, or Firm—Harvey B. Jacobson

[57] ABSTRACT

A drive motor intermittently energized through a battery powered circuit drives a flywheel and a generator at speeds lower than that of the drive motor through a reduction gear assembly. The output voltage of the generator is sensed to control cyclic energization of the drive motor and influence the charge condition of the battery by the generator.

5 Claims, 2 Drawing Figures

ENERGY CONSERVING DRIVE SYSTEM

BACKGROUND OF THE INVENTION

This invention relates generally to the conservation of energy through a power driven system wherein electrical energy is converted to kinetic energy for driving mechanical loads.

Battery powered, motor-generator drive systems for operating mechanical equipment such as automotive vehicles, are well known as disclosed for example in U.S. Pat. Nos. 674,825, 925,385, 3,923,115 and 4,065,702. In all of such prior art systems, a flywheel is utilized to store kinetic energy and thereby reduce loss of generated energy in excess of the amount being used at any time to meet the demand of the load. Often, such drive systems are of the hybrid type in that they include a fuel fed engine. In those drive systems that have no fuel fed engine, such as the system disclosed in Pat. No. 674,825 to De Castro, there are built in mechanical energy losses of motor overload from overdrive of the flywheel at a higher speed and, electrical resistance losses from short circuiting.

It is therefore an important object of the present invention to provide an improved battery powered, motor-generator drive system of the energy storing flywheel type which is more efficient.

SUMMARY OF THE INVENTION

In accordance with the present invention, a drive motor is geared to a flywheel and a generator for rotation thereof at reduced speeds through reduction gearing. When cyclically energized for relatively short periods of time compared to the de-energization periods, the drive motor accelerates the flywheel and the generator until the output of the generator produces an upper limit voltage detected by a voltage sensing circuit to open the power circuit through which the drive motor is energized. The flywheel is then decelerated as it sustains rotation of the generator until the output of the generator decreases to a value corresponding to a lower motor operating voltage limit at which point the drive motor is energized once again to begin another operational cycle. The power circuit has an electrolytic battery pack which is charged by the generator when its output exceeds the load demand.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENT

Figure 1:
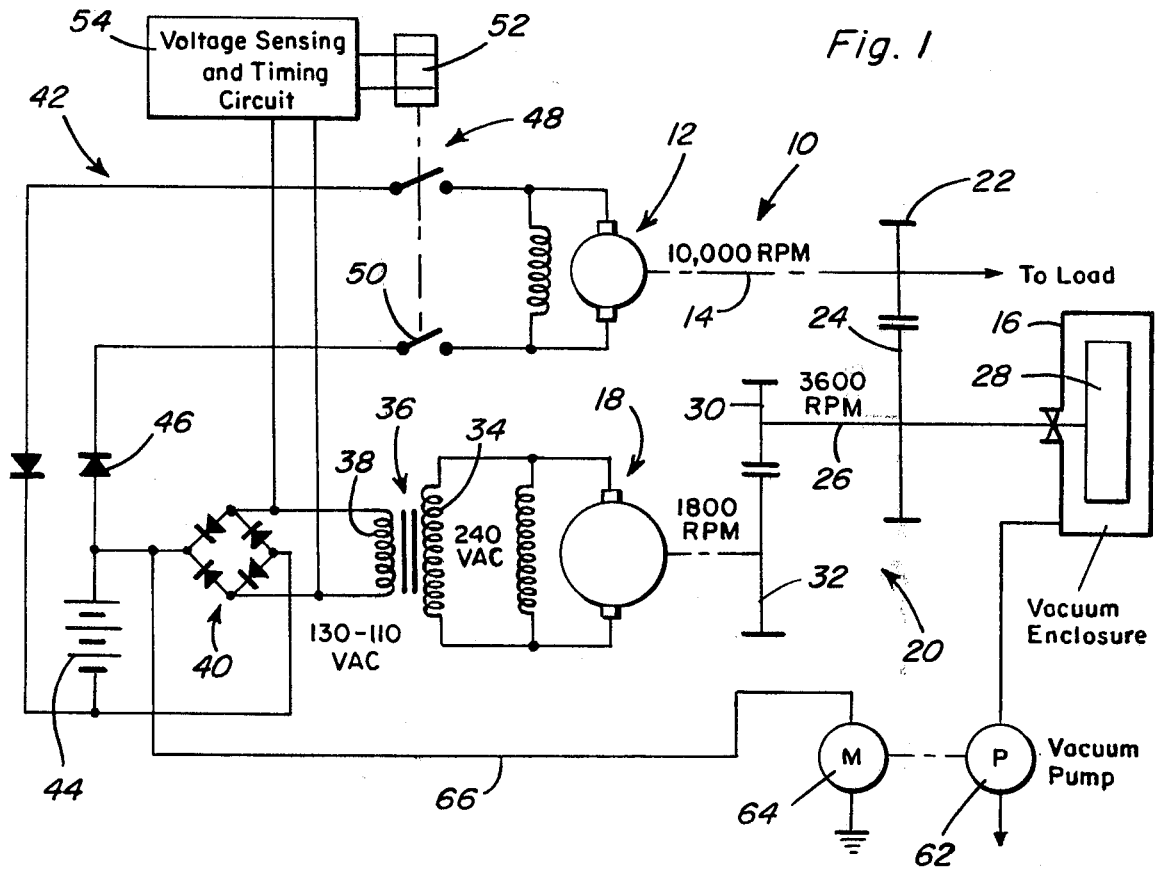
FIG. 1 is an electrical circuit and schematic diagram illustrating the drive system of the present invention.

Referring now to the drawings in detail, FIG. 1 illustrates the drive system of the present invention, generally referred to by reference numeral 10. The drive system includes as its prime mover, a DC drive motor 12, adapted to drive some external load through a load shaft 14 connected to the armature rotor of the motor. The motor load shaft is adapted to be operated at a relatively high speed, such as 10,000 rpm. Further, the motor is adapted to be energized under a DC operating voltage that varies between predetermined limits, such as an upper limit of 130 volts and a lower limit of 110 volts.

The motor output load shaft 14 is drivingly connected to a kinetic energy storing assembly 16, and an AC generator 18, by means of a reduction gear assembly, generally referred to by reference numeral 20. The reduction gear assembly includes a drive gear 22 fixed to the motor load shaft 14 in mesh with a driven gear 24 fixed to an intermediate shaft 26 coupled to a flywheel element 28 associated with the kinetic energy storing assembly 16. The reduction gear ratio between the gears 22 and 24 is such as to cause rotation of the flywheel element 28 at a relatively lower speed than the motor load shaft 14. This reduction gear ratio may be, for example, 25:9, causing the flywheel element to be rotated at 3600 rpm by the drive motor 12 operating at 10,000 rpm.

The intermediate shaft 26 to which the flywheel element 28 is coupled by the reduction gear assembly 20, has another gear 30 connected thereto in mesh with a larger gear 32 connected to the armature rotor of the AC generator 18. The gears 30 and 32 effect a further gear reduction of 2:1, for example, in order to impart rotation to the AC generator at 1800 rpm when the drive motor 12 is operating at 10,000 rpm. Thus, during operation of the load driving DC motor 12 at a relatively high speed, the flywheel element 28 and AC generator 18 are respectively driven at progressively lower speeds.

The AC generator 18 is of a conventional 60-cycle type providing a 240 volt output that is applied to the primary winding 34 of a stepped-down voltage transformer 36 having a secondary output winding 38 across which a motor operating voltage appears. The output winding 38 of the transformer is connected to the input terminals of a full wave rectifier 40, the output terminals of which are connected to the drive motor 12 through a power circuit, generally referred to by reference numeral 42, supplying a DC operating voltage for energization of the drive motor.

The power circuit 42 includes a DC battery pack 44, which may be charged by the output of the generator through transformer 46 and rectifier 40. Accordingly, the battery 44 is connected across the output terminals of the rectifier 40 which are connected in parallel with the battery to the drive motor 12 through diodes 46.

The power circuit 42 is opened and closed to control energization of the drive motor 12 by means of a voltage controlled switch assembly generally referred to by reference numeral 48. The switch assembly, in accordance with one embodiment of the invention, includes a relay device having for example, relay switches 50 and a relay coil 52. Energization of the relay coil is controlled by a voltage sensing and timing circuit 54 of any type well known to those skilled in the art. The voltage sensing and timing circuit is accordingly connected across the output terminals of the transformer 36 in order to sense the output voltage of the generator 18 applied to the drive motor 12. The power circuit is thereby rendered operative through switch assembly 48 to energize the drive motor 12 for relatively short periods of time during which the motor operating voltage increases from a lower limit to an upper limit. At the upper voltage limit, the power circuit 42 is opened causing de-energization of the drive motor for a period substantially longer than the energization period during which the output voltage of the generator 18 loaded by the flywheel assembly 16, decreases toward the lower operating voltage limit associated with the drive motor 12. When the lower operating voltage limit is reached, the power circuit 42 is closed by the switch assembly 48 to again energize the drive motor for the shorter energization period.

Figure 2:
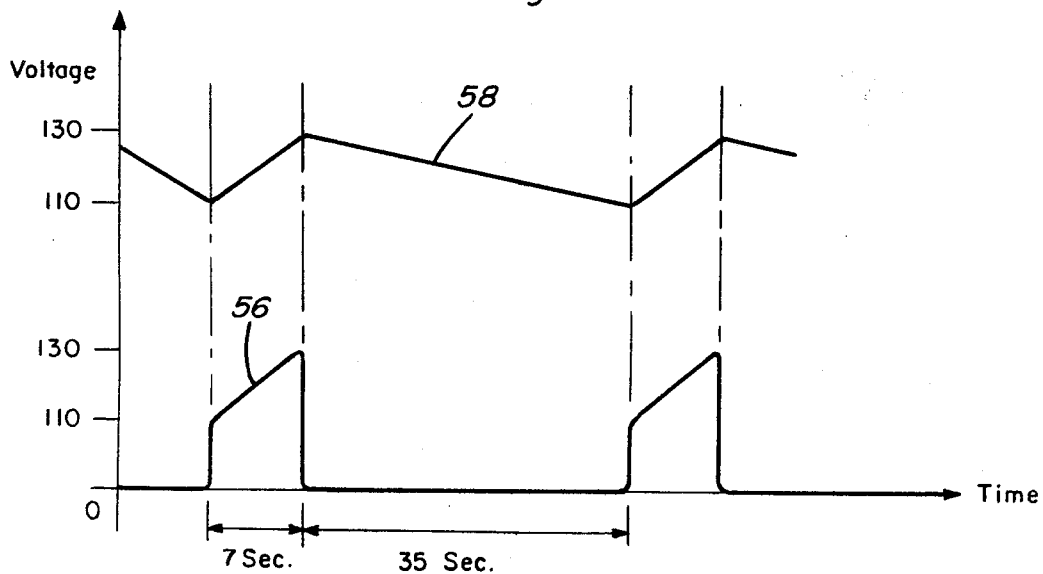
FIG. 2 is a graphical illustration showing certain operational characteristics of the drive system.

As depicted by way of example in FIG. 2, solid line curves 56 graphically depict the relatively short energization periods during which the operating voltage output of the generator rises from the lower limit of 110 volts to the upper limit of 130 volts. The energization periods corresponding to the curves 56 may be of a 7-second duration by way of example, as compared to de-energization periods of 35 seconds, as shown. FIG. 2 also depicts a curve 58 illustrating the variation in the voltage output of the generator at the output terminals of the transformer 36. As depicted in FIG. 2, a 5:1 ratio of "Off" time to "On" time was found suitable with respect to the intermittant energization of the drive motor 12.

As shown in FIG. 1, the kinetic energy storing assembly 16 includes a vacuum sealed enclosure 60 within which the flywheel element 28 is rotatable so as to minimize energy losses because of air friction. The vacuum enclosure may be maintained under vacuum by means of a vacuum pump 62 driven by a pump motor 64 to which energy is continuously supplied by conductor 66 connected to the output of the rectifier 40.

As hereinbefore indicated, the drive motor 12 rotates the output load shaft 14 at a relatively high speed, such as 10,000 rpm, thereby driving the flywheel element 28 at a lower speed of 3,600 rpm and driving the generator 18 at a still lower operating speed 1,800 rpm. The voltage output of the generator 18 appearing across the output terminals of the rectifier 40 will accordingly increase during the "On" period as it is accelerated by the drive motor until the upper voltage limit of 130 volts is attained, at which point such voltage is detected by the voltage sensing and timing circuit 54 in order to open the power circuit 42 through the relay switches 50. The drive motor will accordingly be de-energized for an "Off" period of longer duration than the "On" period. During the "On" period while the drive motor is energized for accelerating rotation of both the flywheel element 28 and the generator 18, the flywheel absorbs kinetic energy. During the "Off" period while the drive motor is de-energized, the generator 18 continues to rotate at a decreasing speed and with a decreasing output voltage as the flywheel is decelerated in response to depletion of its stored energy. When the output voltage of the generator 18 appearing at the output terminals of the rectifier 40 reaches the lower operating voltage limit of 110 volts, this condition is sensed by the circuit 54 to cause energization of the drive motor 12 once again. Such cyclic energization and de-energization of the drive motor is maintained for acceptable 60-cycle operation of the AC generator 18. Further, during such cyclic operation any output energy of the generator not absorbed by the energy storing flywheel assembly or the load connected to the load shaft 14, will be stored in the battery pack 44 to which the generator is coupled by the rectifier 40. The battery pack 44 may be of a liquid electrolytic type in which the electrolyte is maintained at a specific gravity between 1:100 and 1:200 during cyclical operation of the drive system as hereinbefore described. Recharging of the battery pack with electrolyte will, of course, be required to maintain the drive system in proper operative condition.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An energy conserving drive system, comprising a generator, a drive motor, an energy storing flywheel, battery powered circuit means interconnecting the generator and the motor for energization of the motor operating at a relatively high speed under an operating voltage, switch means connected to the circuit means for intermittently interrupting said energization of the motor, and reduction gear means drivingly interconnecting the motor with the flywheel and the generator for rotation thereof at lower speed than the motor.

2. The combination of claim 4 wherein said switch means comprises a relay device rendered operative to energize and de-energize the motor for periods of respectively different duration, and voltage sensing means connected to the power circuit means for rendering the relay device operative in response to increases in motor operating voltage above lower and upper limits.

3. The system as defined in claim 1 wherein said switch means includes voltage sensing means operatively connected to the generator for detecting deviation of said operating voltage from a predetermined operating range, and relay means responsive to said deviation of the operating voltage for controlling the circuit means to maintain said operating voltage within the predetermined operating range.

4. An energy conserving drive system, comprising a generator, a drive motor, an energy storing flywheel, power circuit means interconnecting the generator and the motor for energization of the motor rotating at a relatively high speed under an operating voltage, switch means connected to the circuit means for intermittently interrupting said energization of the motor, and reduction gear means drivingly interconnecting the motor with the flywheel and the generator for rotation thereof at lower speeds than the motor, said power circuit means including voltage reducing means operatively connecting the generator to the drive motor, and a battery connected to the voltage reducing means in parallel with the drive motor.

5. In combination with a drive system having a drive motor energized by a battery through a power circuit to which a generator is coupled for charging the battery during periods when the drive motor is unloaded and a flywheel drivingly coupled to the motor and the generator storing excess output energy of the drive motor that is supplied to the generator during periods when the motor is fully loaded, the improvement residing in reduction gear means drivingly connecting the drive motor to the flywheel and the generator for rotation thereof at progressively lower speeds than the drive motor, and voltage controlled switch means connected to the power circuit for intermittently energizing and de-energizing the drive motor in response to increase in the output voltage of the generator above lower and upper limits, establishing an operating voltage range for the drive motor.

* * * * *